United States Patent [19]
Suzuki

[11] Patent Number: 6,123,350
[45] Date of Patent: *Sep. 26, 2000

[54] VIBRATION DAMPER EQUIPPED SUSPENSION SYSTEM FOR AUTOMOTIVE VEHICLES

[75] Inventor: Takayuki Suzuki, Kanagawa-ken, Japan

[73] Assignee: Nissan Motor Co., Ltd., Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/970,157

[22] Filed: Nov. 13, 1997

[30] Foreign Application Priority Data

Nov. 14, 1996 [JP] Japan ................................. 8-303262

[51] Int. Cl.7 ................................................ B60G 13/00
[52] U.S. Cl. ................................ 280/124.108; 188/379
[58] Field of Search ........................ 280/124.108, 124.1, 280/124.154, 124.146, 124.151; 188/378, 379, 380; 267/221, 222, 223, 224, 225

[56] References Cited

U.S. PATENT DOCUMENTS

| | | | |
|---|---|---|---|
| 1,737,048 | 11/1929 | Hunt ........................................... | 280/89 |
| 2,901,239 | 8/1959 | Sethna ...................................... | 267/224 |
| 2,917,303 | 12/1959 | Vierling .................................... | 267/225 |
| 3,263,983 | 8/1966 | Bliven ...................................... | 267/220 |
| 3,806,150 | 4/1974 | Peart et al. ......................... | 280/124.108 |
| 4,210,343 | 7/1980 | Shiomi et al. ..................... | 280/124.108 |
| 4,240,517 | 12/1980 | Harlow, Jr. et al. ..................... | 180/295 |
| 4,366,969 | 1/1983 | Benya et al. ............................. | 280/668 |
| 4,377,218 | 3/1983 | Fukushima .............................. | 180/300 |
| 4,482,135 | 11/1984 | Ishida et al. ............................ | 267/8 R |
| 4,815,556 | 3/1989 | Sumimoto et al. ..................... | 180/311 |
| 5,364,081 | 11/1994 | Hartl ................................... | 267/64.25 |
| 5,564,536 | 10/1996 | Lai ......................................... | 188/379 |

OTHER PUBLICATIONS

Ozaki, Keiji; *How is the mechanism of a motor vehicle (chassis/body)*; Grand prix Shuppan, Inc.; Dec. 19, 1992 (first edition) and Mar. 1, 1994 (third edition).

*Primary Examiner*—J. J. Swann
*Assistant Examiner*—David R. Dunn
*Attorney, Agent, or Firm*—McDermott, Will & Emery

[57] ABSTRACT

In order to damp vibration which are generated by rotating members such as wheels, drive shafts and the like, a vibration damper, preferably a dynamic damper, is mounted on the shock absorbers at a location which is essentially midway between the lower end thereof. This places the damper a location corresponding to an antinode of a vibration waveform which transmitted through the shock absorbers and which tends to cause annoying cabin reverberation noise and thus increases the effect with which vibration is attenuated. An advantageous mounting site for the damper is on the lower spring seat of the shock absorber.

9 Claims, 8 Drawing Sheets

VIBRATION DAMPER EQUIPPED SUSPENSION SYSTEM FOR AUTOMOTIVE VEHICLES

BACKGROUND OF THE INVENTION

1. Field of the Invention

The present invention relates to a suspension system of a vehicle, and more particularly to the suspension system of a vehicle which is adapted to reduce annoying reverberation cabin noise when the vehicle is running at high speed.

2. Description of the Related Art

Conventionally, the power train of a vehicle, including an engine, transmission and differential device, is supported on a body or body frame (chassis) through a subframe. However, this construction permits vibration from the power train and wheels to be transmitted to the body or the body frame and causes vibration and/or noise in the vehicle cabin.

In order to overcome this problem, U.S. Pat. No. 4,815,556 discloses an apparatus for reducing vibration transmitted to the body frame which utilizes a dynamic damper on the subframe. However, this arrangement suffers from the drawback that it does not adequately attenuate reverberation cabin noise which is produced during high speed vehicle operation.

SUMMARY OF THE INVENTION

It has been found through experimentation that the reverberation noise is related to vibration produced by rotating bodies such as the wheels or drive shafts associated with the suspension, and that this vibration, which has a notable influence on the cabin noise, is mainly input to the body of the vehicle through the shock absorbers of the vehicle suspension.

Accordingly, it is an object of the present invention to provide a suspension system for a vehicle which is able to reduce the reverberation cabin noise by reducing the vibration produced by rotating bodies which are transmitted to the vehicle body via the vehicle suspension.

It is another object of the present invention to provide a suspension system for a vehicle which is able to reduce the cabin reverberation noise efficiently.

A further object of the present invention to provide a suspension system for a vehicle which includes a simple arrangement which will reduce cabin reverberation noise.

In brief, the above objects are achieved by an arrangement wherein, in order to damp vibrations which are generated by rotating members such as wheels, drive shafts and the like, a vibration damper is mounted on a shock absorber at a location which is between the points at which the device is connected between the upper and lower end thereof. This places the damper between the nodes of the vibration which is transmitted through the shock absorber and which tends to cause annoying cabin reverberation noise and thus increases the effect with which vibration is attenuated.

An advantageous mounting site for the vibration damper is on the lower spring seat of the shock absorber.

More specifically, a first aspect of the invention resides in a suspension system of a vehicle comprising: a shock absorber connected a vehicle body and a driven wheel; and a vibration damper attached to a outer member of said shock absorber.

A second aspect of the invention resides in a shock absorber which is adapted for connection between a vehicle body and a wheel, and which comprises a vibration damper attached to a predetermined site on an outer member of said shock absorber.

In the embodiments of the invention, while a dynamic type vibration damper is used, it is not outside the scope of the invention to use mass dampers, which use fixed masses, in place thereof.

BRIEF DESCRIPTION OF THE DRAWINGS

The various other objects and features of this invention will become more clearly understood from the following description which is taken in conjunction with the appended drawings in which.

DETAILED DESCRIPTION OF THE INVENTION

Figure 1:
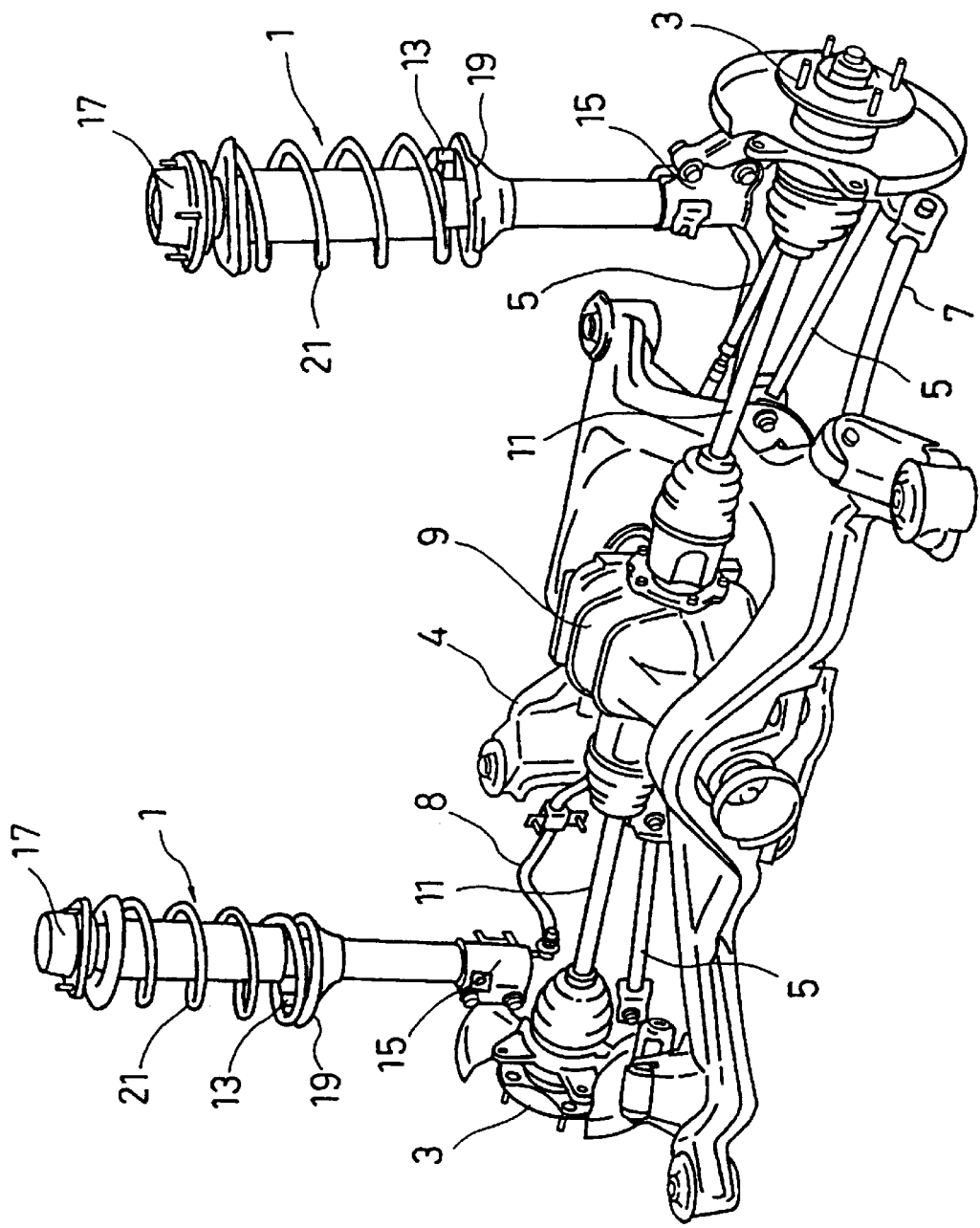
FIG. 1 is a perspective view of a rear suspension which is equipped with an embodiment of this invention.

Referring to the attached drawings, FIG. 1 shows a rear suspension system of a vehicle, which in this instance is, merely by way of example, of the front engine rear wheel drive type. This suspension arrangement includes shock absorbers 1. The upper ends of these shock absorbers are secured to a vehicle body (not shown) via insulators 17, while the lower ends are connected to wheel hubs 3 via brackets 15. Each wheel hub 3 is operatively connected with the sub-frame member 4 by way of a lateral link 5, a radius rod 7, and a stabilizer 8. The latter mentioned stabilizer 8 operatively interconnects the left and right wheel hubs in a conventional manner.

A differential device 9 is operatively connected with a propeller shaft (not shown) and includes left-hand and right-hand drive shafts 11 which project laterally out from the differential 9. Each of drive shafts 11 is connected to a wheel hub 3 in a manner wherein driving torque of an engine (not shown) is transmitted to the wheel hubs.

Figure 2:
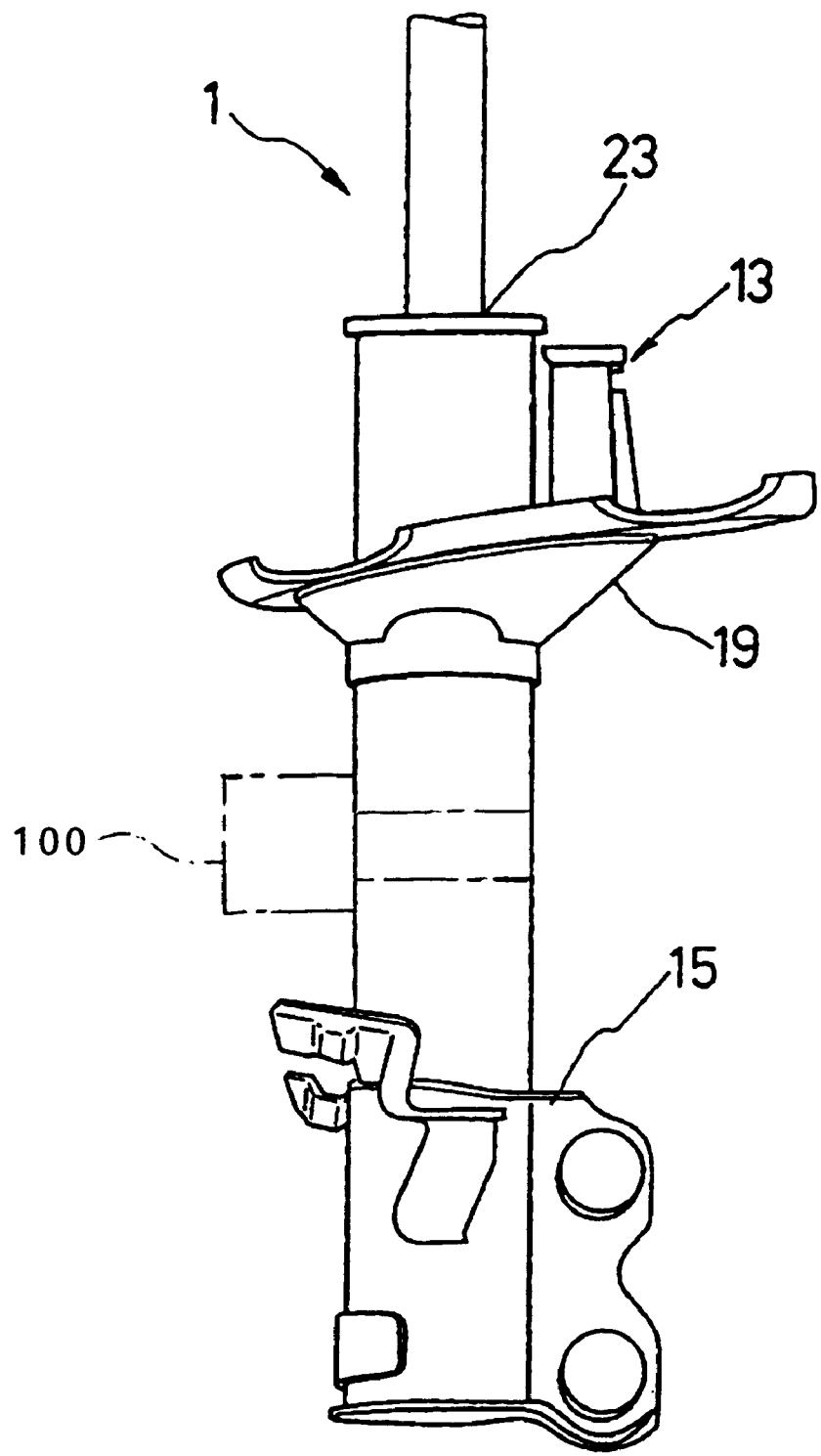
FIG. 2 is a side view of a shock absorber showing a member in which a dynamic damper is secured to the shock absorber.

As mentioned above and shown in FIG. 1 and FIG. 2, each shock absorber 1 is connected to the vehicle body (not shown) via an insulator 17 at an upper end and to a wheel hub 3 via a bracket 15 and at a lower end. Each shock absorber 1 is provided with a dynamic damper 13 which is attached to an outer surface of the device at approximately a mid-point between the upper and lower ends thereof.

These dynamic dampers 13 are each respectively attached to a spring seat 19 which supports a lower end of coil spring 21 placed around the shock absorber 1. Therefore, the dynamic damper 13 is disposed at a location corresponding to an antinode of a vibration waveform which is transmitted between the upper and lower ends of the shock absorber 1.

As shown in FIG. 4 to FIG. 7, the spring seat 19 comprises a support portion 25 and 27 at inner side of the coil spring 21. Each of the support portions 25 and 27 is formed with a plain surface which includes through holes 29 and 31, for attaching the dynamic damper 13. The spring seat 19 provides a continuous surface 33 between the support portion 25 and 27. This continuous surface 33 is formed lower position than the support portion 25 and 27.

Figure 3:
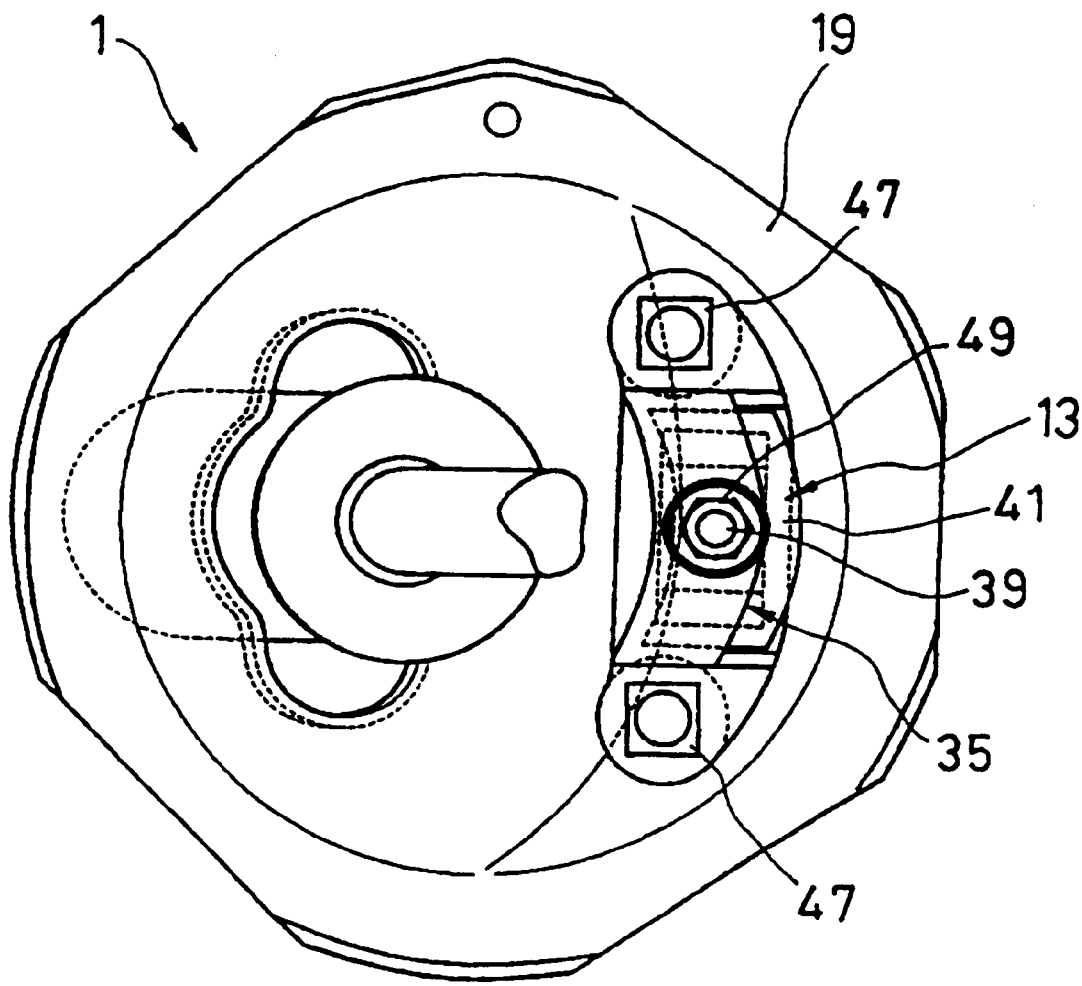
FIG. 3 is a plan view of the shock absorber shown in FIG. 2 showing the manner in which the dynamic damper is secured to a spring seat of the shock absorber.
Figure 4:
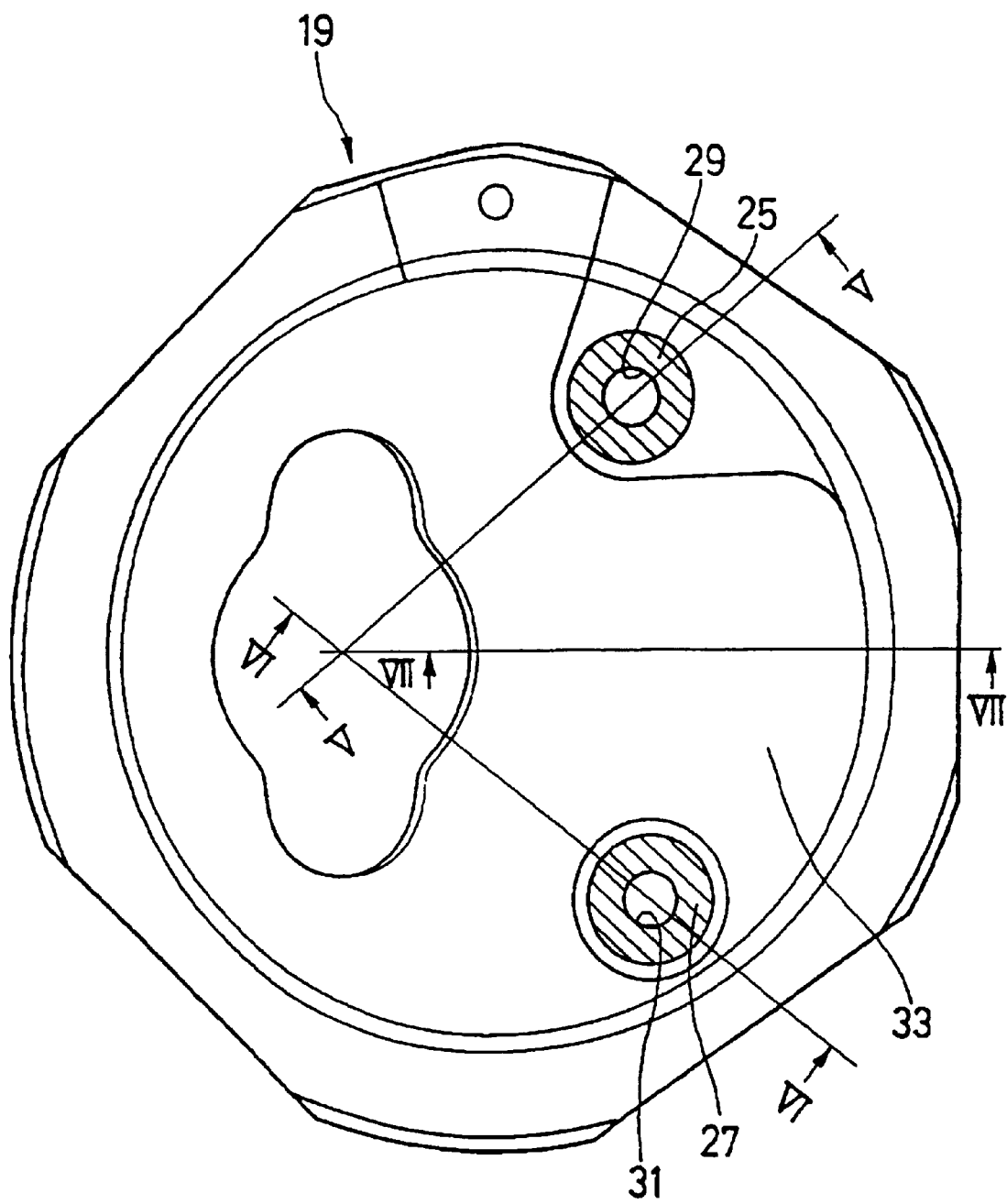
FIG. 4 is a plan view of the spring seat shown in FIG. 3.
Figure 5:
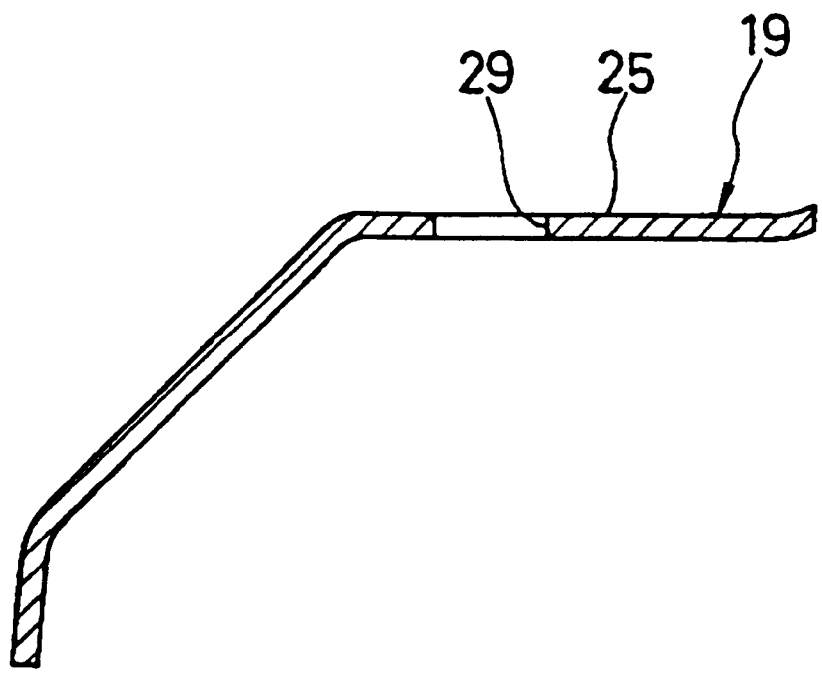
FIG. 5 is a cross-sectional view taken along section line V—V of FIG. 4.
Figure 6:
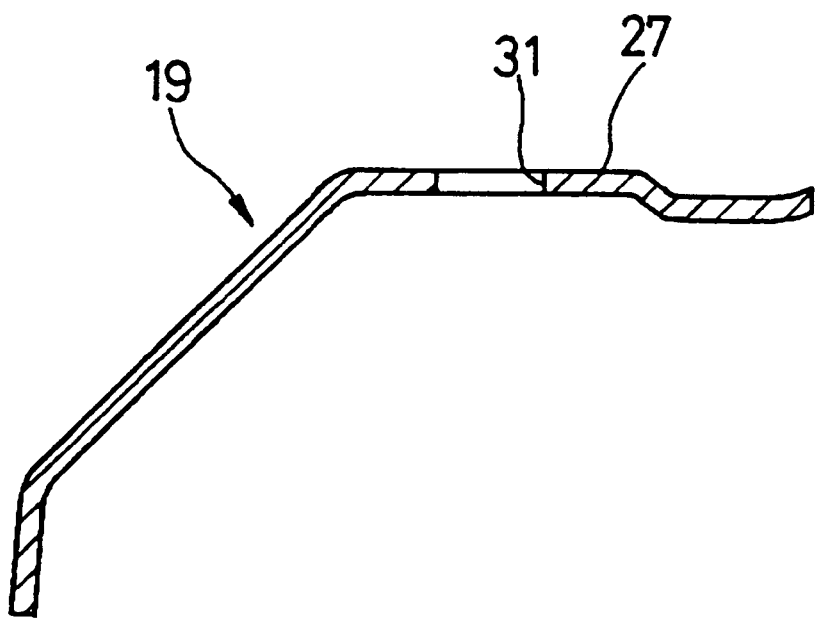
FIG. 6 is a cross-sectional view taken along section line VI—VI of FIG. 4.
Figure 7:
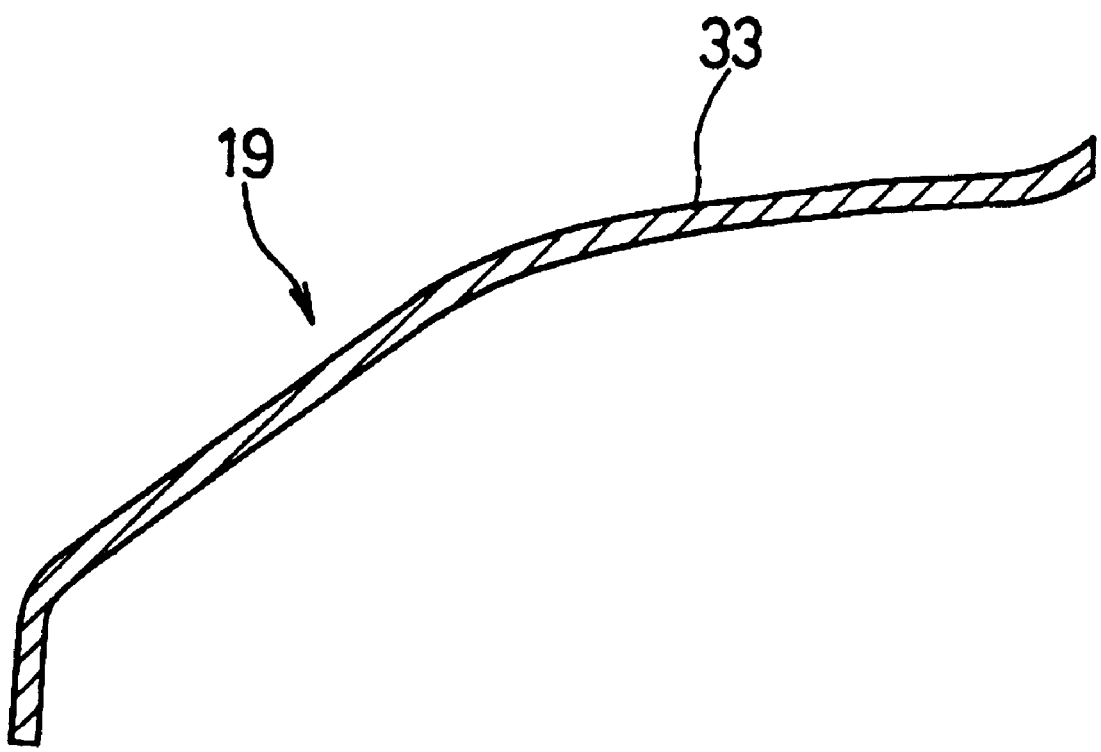
FIG. 7 is a cross-sectional view taken along section line VII—VII of FIG. 4.
Figure 8:
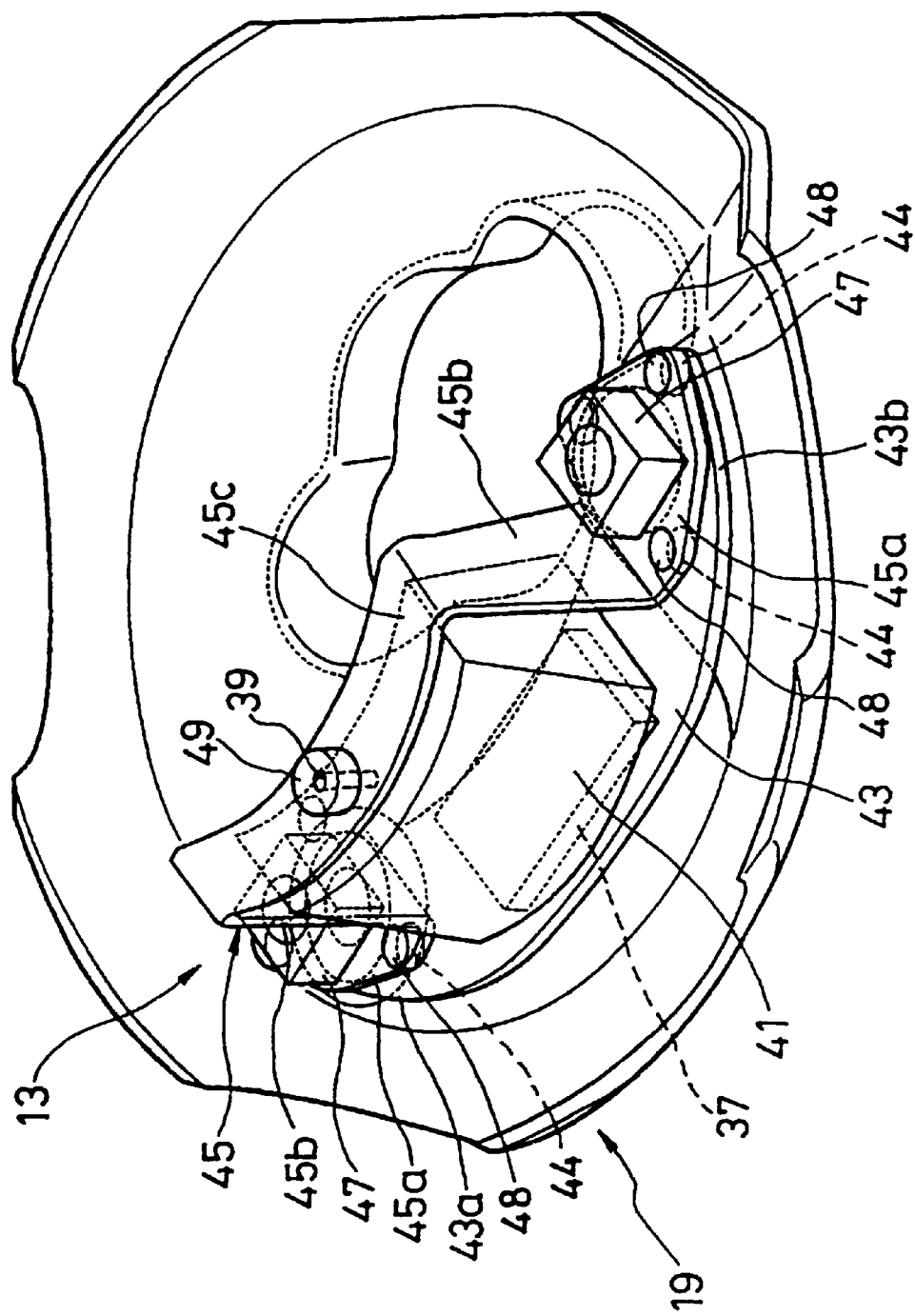
FIG. 8 is a perspective showing the dynamic damper attached to the spring seat.
Figure 9:
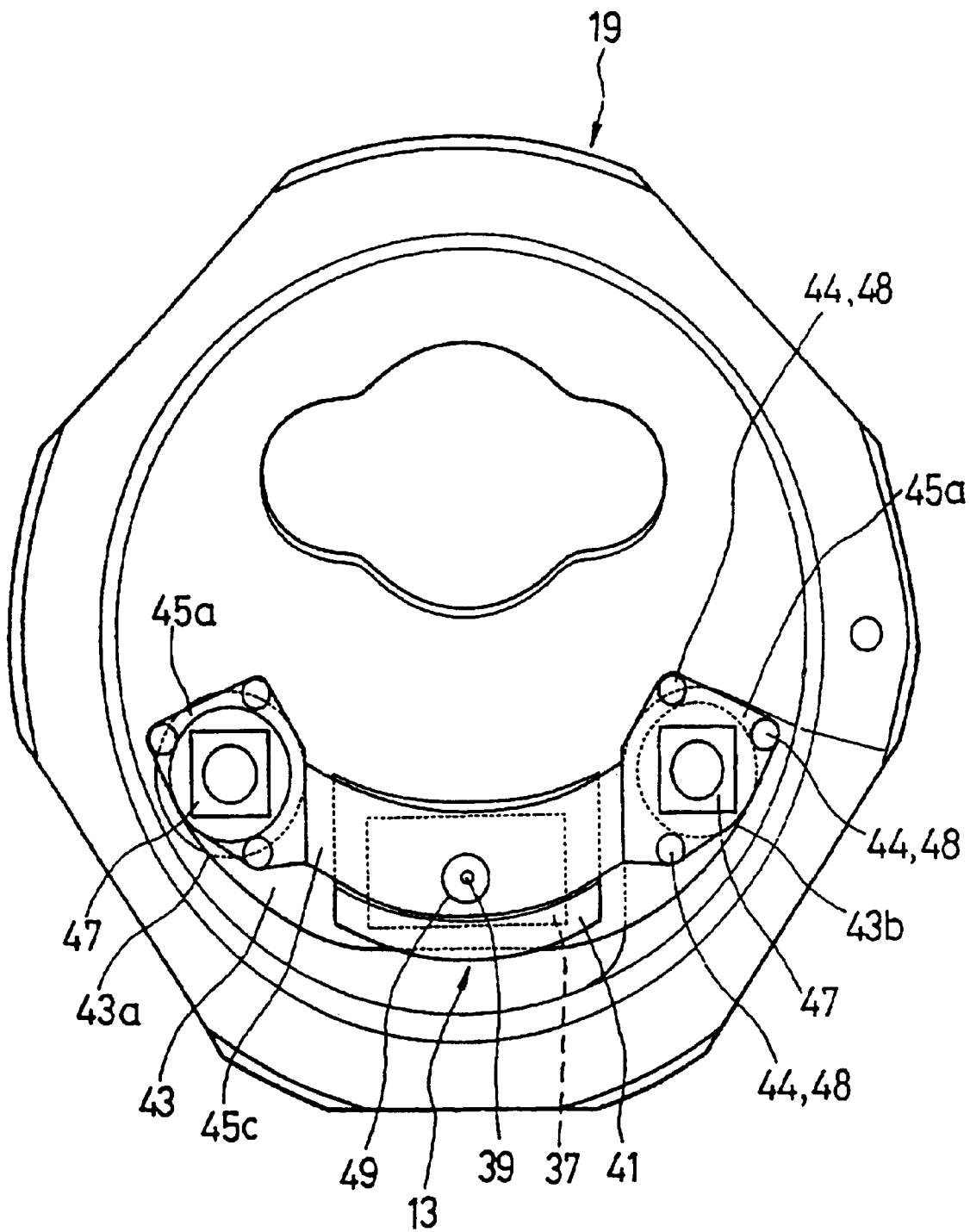
FIG. 9 is a plan view of the spring seat showing the disposition of the dynamic damper thereon.

As shown in FIGS. 3, 8 and 9, the dynamic damper 13 comprises a bracket 35 which is secured to the spring seat 19, and a mass 41 which is connected to the bracket 35 by elastic members 37, 39. The bracket 35 comprises a lower member 43 and an upper member 45 which are arranged to extend in the longitudinal direction of the vehicle.

The lower member 43 is formed of steel plate and is arranged to form a bridge-like structure which spans the gap between the support portion 25 and 27. This lower member 43 is formed so as to have an arc shape which corresponds essentially to the curvature of the spring seat 19, as seen in plan view. The lower member 43 provides a gap between itself and the continuous surface 33 when the end portions of 43a and 43b of the lower member are secured to the support portions 25 and 27. Each of the end portions 43a and 43b is provided with a through hole for a fastener such as a bolt, and three stud-like projections 44.

The upper member 45 is formed of steel plate, and includes a connection portion 45a at each end, vertical walls 45b each integral with the connecting portion 45a, and lateral wall 45c interconnecting the vertical walls 45b. The lateral wall 45c is formed so as to have an arc shape corresponding to the lower member 43. Each of connection portions 45a has a nut 47 (hereinafter weld nut) welded thereto, and a through hole (not shown) which is coaxial with the screw hole of the weld nut 47. These portions each further have three pits or apertures 48 are disposed for receiving the stud-like projections 44.

End portions 43a and 43b of the lower member 43, and each of fixing portions 45a of upper member 45 are disposed on the support portion 25 and 27 while aligning each of through hole of lower member 43 and upper member 45 using the provisional engagement provided by the engaging projections 44 and pits 48. The lower member 43 and upper member 45 are fixed to the support portion 25 and 27 by threading a bolt into the weld nut from the lower side of the through holes 29 and 31 of the support portion 25 and 27.

The elastic member 37 has a rectangular shape, and is fixed on the lower member 43 at its lower side. The elastic member 37 is also fixed to the mass 41 at its upper side. The other elastic member 39, which has a pin-like shape, is inserted in the upper side of the mass 41. The pin-like elastic member 39 extends through the lateral wall 45c, and is fixed to the lateral wall 45c by securing a nut 49.

The mass 41 has an essentially rectangular shape, and is surrounded by the lower member 43 and the upper member 45.

The vibration damping characteristics of the dynamic damper 13 are controlled by setting the weight of mass 41 and the elasticity of elastic members 37 and 39.

In the above embodiment, the dynamic damper 13 is placed at a location which corresponds to an antinode of a vibration waveform between the upper and lower ends of the shock absorber 1 by mounting the dynamic damper 13 approximately mid-way between the upper and lower ends of the shock absorber 1. Therefore, it is possible to make the dynamic damper 13 work efficiently, and reduce the vibration which transmits to the vehicle body via the shock absorber 1.

The dynamic damper 13 is, in this embodiment, attached to the shock absorber 1 by way of the spring seat 19. This facilitates an easy attachment of the dynamic damper 13 to the shock absorber 1.

Since the mass 41 of the dynamic damper 13 is secured between the lower member 43 and upper member 45 of the bracket 35, it is possible to prevent detachment of the mass 41. Particularly, the bracket 35 is directed to the longitudinal direction of the vehicle, it is possible to prevent movement of the mass 41 through engagement with the vertical wall 45b of the upper member 45 in the event of the accident.

Since the mass 41 is secured to the spring seat 19 by the bracket 35, attachment of the dynamic damper 13 to the shock absorber 1 is made easy.

Although the invention has been described with respect to only a single specific embodiment, the appended claims are not limited thereto and should be construed as embodying all modifications and alternative constructions that may occur to one skilled in the art which fairly fall within the basic teaching herein set forth.

For example, the arrangement of the dynamic damper is not limited to the disposition on the lower spring seat per se, and may be mounted on a bracket which is welded or securely clamped to a wall portion of the shock absorber strut tube. This type of mounting of course permits the damper to be disposed at the most effective position in the event that disposition on the lower spring seat, should, for any reason not be completely effective. It is further within the purview of the disclosed invention to provide more than one damper per shock absorber to allow for the use of dynamic dampers having different resonance frequencies, if such is so desired. Dampers each having a plurality of different masses can also be deemed to be within the purview of the invention.

The invention is not limited to dynamic dampers and it is possible to alternatively use a mass damper arrangement in lieu of a dynamic type of arrangement. For example, it is within the scope of the present invention to simply fixed a mass of an appropriate size to the lower spring seat 19, or to the strut tube. An example of the latter type of arrangement, generally indicated by the numeral 100, is shown in phantom in FIG. 2.

What is claimed is:

1. A suspension of a vehicle comprising:

a shock absorber operatively connected between a vehicle body and a road wheel, said shock absorber comprising an outer member, a piston reciprocatively disposed in the outer member, and a piston rod which is operatively connected with the piston and which extends out of the outer member;

a spring seat immovably connected to the outer member of said shock absorber and supporting a coil spring which extends about said shock absorber;

a bracket immovably connected to said spring seat;

a mass; and an elastic member which is connected to both said mass and said bracket and which supports said mass on said bracket so that said mass can vibrate independently of the bracket and act as a dynamic damper.

2. A suspension system of a vehicle as claimed in claim 1, wherein said bracket further includes side portions which face side surfaces of said mass, and an upper portion which connects both of said side surface and which faces an upper portion of said mass.

3. A suspension system of a vehicle as claimed in claim 2, wherein said side portions are arranged in a generally for-and-aft direction of said vehicle.

4. A suspension system, as claimed in claim 1, wherein said elastic member exclusively connects said mass to said bracket.

5. A suspension system for a vehicle comprising:

a spring seat which is immovably connected to an outer member of a shock absorber which slidably receives a piston rod connected to a piston reciprocatively disposed in the outer member, the piston rod being arranged to project out of the outer member for connection to a vehicle component;

a spring which is disposed in a predetermined spatial relationship with the shock absorber body and which engages said spring seat;

a bracket which is immovably connected to said spring seat; a vibratable mass which is free of contact with said spring and which is at least in part surrounded by said bracket; and an elastic member having a first portion fixedly connected with said bracket and a second portion fixedly connected with said vibratable mass, said elastic member and said bracket operatively connecting said vibratable mass to said spring seat so that said vibratable mass can vibrate with respect to the spring seat and with respect to the spring so as to act as a dynamic damper.

6. A suspension system as claimed in claim 5, wherein said spring seat is disposed at a location which is essentially corresponding to an anti-node of a vibration which passes though the shock absorber body.

7. A suspension system as claimed in claim 1, wherein said bracket has side portions and a top portion, wherein the first portion of said elastic member which is fixedly connected to said bracket, is connected to said top portion, and wherein the side portions are arranged with respect to said shock absorber body so that when the shock absorber is mounted on a vehicle, the side portions are arranged in an essentially fore-and-after alignment with respect to the vehicle.

8. A suspension system as claimed in claim 5, wherein said spring seat is disposed on the outer member of the shock absorber at a location which essentially corresponds to an anti-node of a vibration which passes though the shock absorber body and at a location which is distal from both ends of the shock absorber.

9. A suspension system of a vehicle comprising:

a shock absorber operatively connected between a vehicle body and a road wheel;

a spring seat connected to an outer member of said shock absorber and supporting a coil spring which extends about said shock absorber;

a mass;

an elastic member connected to said mass; and a bracket disposed on said spring seat and connected to said mass by said elastic member; and wherein said bracket comprises:

a first member connected to said spring seat;

a second member connected to said first member;

a projection formed on one of an upper surface of said first member and a lower surface of said second member; and a pit which receives said projection in one of said second member and said first member.

\* \* \* \* \*